J. J. LANAHAN.
SIGNAL DEVICE FOR VEHICLES.
APPLICATION FILED FEB. 10, 1915.
1,206,002.
Patented Nov. 28, 1916.
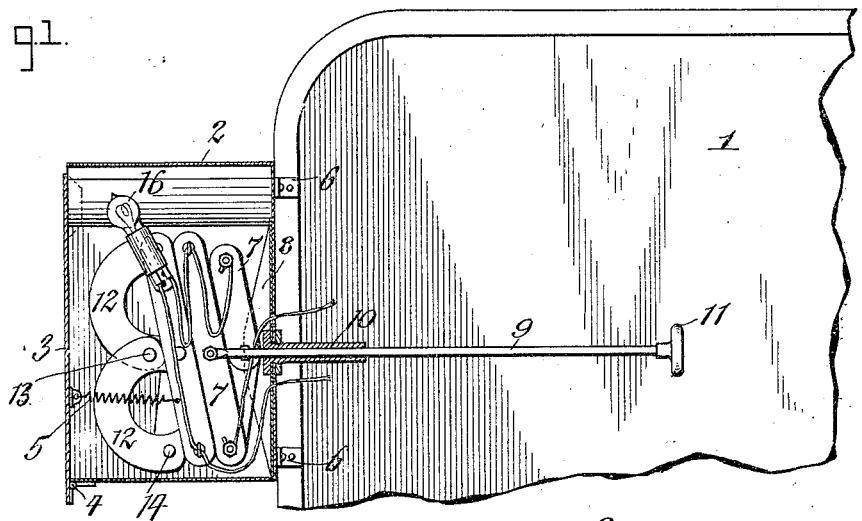
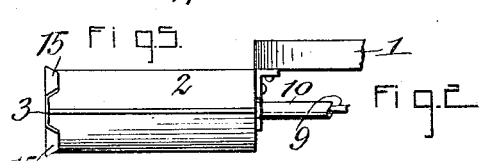
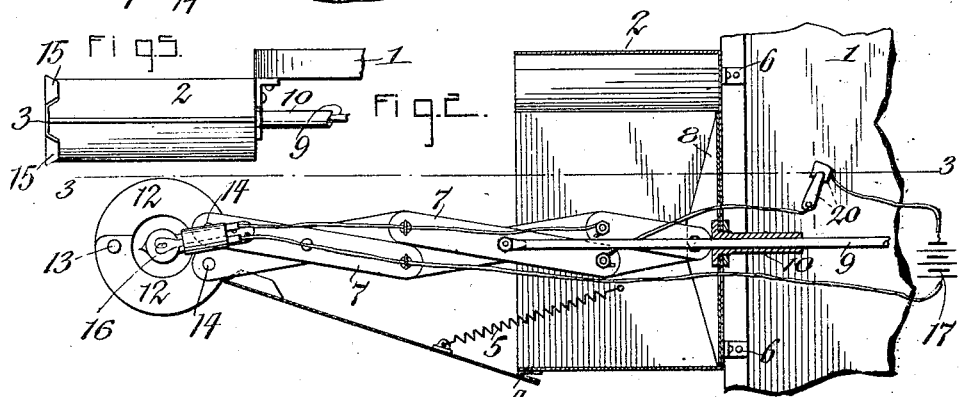
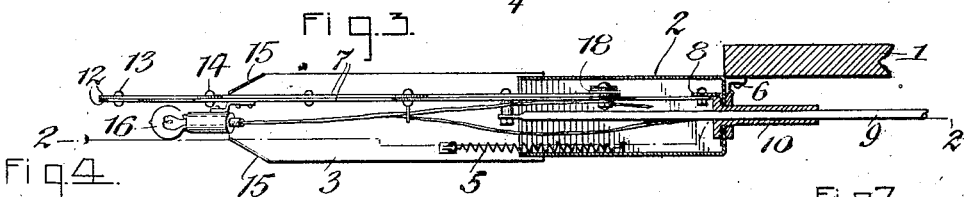
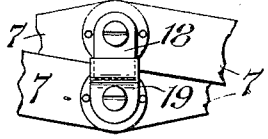
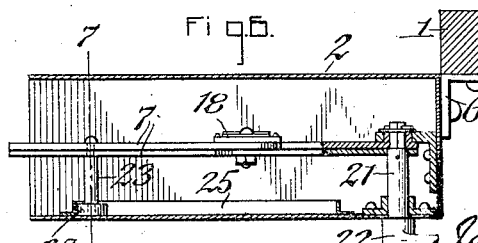
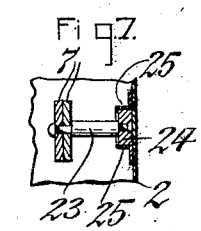
WITNESSES.
Julius J. Prible
Anna Heigis
INVENTOR
James J. Lanahan
by Geyer & Robb
ATTORNEYS.

UNITED STATES PATENT OFFICE.

JAMES J. LANAHAN, OF BUFFALO, NEW YORK.

SIGNAL DEVICE FOR VEHICLES.

1,206,002.

Specification of Letters Patent.   Patented Nov. 28, 1916.

Application filed February 10, 1915.   Serial No. 7,265.

*To all whom it may concern:*

Be it known that I, JAMES J. LANAHAN, a citizen of the United States, residing at Buffalo, in the county of Erie and State of New York, have invented new and useful Improvements in Signal Devices for Vehicles, of which the following is a specification.

This invention relates to a signal device for use on automobiles and other vehicles for the purpose of enabling the driver or chauffeur to indicate the direction in which he intends to steer his car and thereby warn the drivers of other automobiles or vehicles or pedestrians for avoiding accidents.

It is the purpose of this invention to provide a signal device of this character which is very simple in construction and efficient in operation and which will not detract from the appearance of the vehicle to which it is applied.

In the accompanying drawings: Figure 1 represents a sectional elevation of a signal device embodying my improvements and showing the same in an inoperative position. Fig. 2 is a similar view taken in line 2—2, Fig. 3, showing the same in an operative position. Fig. 3 is a horizontal section taken in line 3—3, Fig. 2. Fig. 4 is a fragmentary elevation, on an enlarged scale, showing the switch for opening and closing the electric circuit of the signal lamp. Fig. 5 is a top plan view of the signal device, as shown in Fig. 1. Fig. 6 is a fragmentary horizontal section, similar to Fig. 3, showing a modification of part of my invention. Fig. 7 is a fragmentary vertical transverse section taken in line 7—7, Fig. 6.

Similar characters of reference indicate corresponding parts throughout the several views.

Although my improved signal device is applicable to various parts of an automobile or vehicle the same is represented in the drawings as mounted on the vertical edge of the dash board 1 so as to be within convenient reach of the chauffeur or driver while the latter is occupying his seat. As shown in the drawings, only one signal device is mounted on the left hand edge of the dash board but it is to be understood that a signal device of this character may also be mounted upon the right hand edge of the dash board so that a signal may be given to persons either in front or in rear of the car as to the direction in which the car will be moved.

In its general organization my improved signal comprises a casing or housing mounted on the automobile and a semaphore arm which is movable laterally into and out of the casing. In its preferred form the casing or housing comprises a body 2 which is preferably constructed of sheet metal and which has fixed front, rear and inner walls and a fixed top and bottom and a movable outer door or lid 3 which is pivotally connected at its lower edge to the outer end of the bottom by means of a hinge 4, as shown in Figs. 1 and 2. This lid or door is yieldingly held in its closed position by means of a spring 5 arranged within the casing and connected at its opposite ends with the inner sides of the lid and body. The casing may be secured to the dash board in any suitable manner, for instance, by means of brackets or clips 6 connecting the inner wall of the body with the vertical edge of the dash board.

Within the casing is arranged a signal or semaphore arm which is so constructed that it may be projected outwardly through the outer open end of the body or retracted within the same, this arm being provided with means which will serve as a day signal and also as a night signal. In its general organization this arm is composed of a plurality of pairs of levers or links 7 each pair being pivotally connected with each other and also with adjacent pairs so that upon moving these levers in a direction for causing them to assume an approximately horizontal position this arm will be extended horizontally while upon moving these levers so they assume a more nearly vertical position the arm will be contracted, in a manner similar to the operation of a pair of lazy-tongs. The innermost pair of levers of this extensible and contractible arm are pivoted on a flange 8 mounted on the inner wall of the body so that the effective lateral movement of this arm occurs at the outer end of the outermost pair of levers. The extension and contraction of the levers of this arm may be produced by various means, those shown in Figs. 1, 2 and 3 comprising a horizontally and transversely movable shipper rod 9 which is guided in a way 10 mounted on the inner wall of the body and connected within the casing to one of the pivots between a pair of levers and provided outside of the casing adjacent to the chauffeur's seat with a handle or fingerpiece 11 of any suitable construction which may be grasped by the chauffeur for manipulating the signal device.

On the outer ends of the outermost pair of levers of the signal arm is mounted a signal head which operates as a direction signal during the daytime when projected from the casing. This signal head preferably comprises two semi-circular ring sections 12 which have their outer ends pivotally connected with each other by means of a rivet or pin 13, while their inner ends are connected respectively by means of pivot pins or rivets 14 with the outer ends of the outermost pair of levers of the semaphore arm. Upon projecting the semaphore arm from one side of the vehicle the two sections of the signal head together form practically a complete ring, as shown in Fig. 2, so that the same serves as a signal during daytime. Upon retracting the semaphore arm within the casing the two sections of this signal head are unfolded or spread apart into approximately the shape of the numeral 3, as these sections follow the movements of the retracting semaphore levers, as shown in Fig. 1.

As the semaphore arm is projected from the casing the same pushes the door outwardly and downwardly into an open position and in opposition to the resilience of the spring 5, as shown in Fig. 2, but when this arm and the parts mounted thereon are again retracted into their inoperative position within the casing the door is again closed by the tension of this spring, as shown in Fig. 1. The door is therefore by this means automatically opened and closed upon moving the semaphore arm into and out of its operative position without requiring any special or separate means for this purpose. The operative parts of the signal device are thus always concealed from view as well as protected against the weather when not in use, so that this device does not detract from the appearance of the vehicle. In order to retain the door in its proper position relative to the semaphore arm and the casing the free end of the door is provided on its inner side with two inwardly projecting retaining flanges 15 which are adapted to be arranged on opposite sides of the outer part of the semaphore arm when the latter is in its projected position and the door is open, as shown in Figs. 2 and 3, and which are also adapted to engage with opposite sides of the body of the housing when the lid or door is closed, as shown in Figs. 1 and 5, for the purpose of holding these parts against lateral displacement relatively to each other.

In order to utilize this device as a signal during the night time a lamp 16 preferably an electric light bulb is so mounted on the arm of the signal device that in the projected position of this arm this lamp will be arranged in line with the space or opening within the ring of the signal head, as shown in Fig. 2 and means are provided for illuminating the same while in this position. This lamp is preferably mounted on one of the levers of the outermost pair and the terminals of the same are adapted to be connected with opposite sides of an electrical generator 17 which may be of any suitable form, such for instance, as a battery or a dynamo mounted on the vehicle. The circuit including this generator and the lamp is preferably opened so as to extinguish the lamp when the semaphore arm is retracted and closed so as to illuminate the lamp when this arm is projected. This opening and closing of the electric circuit is preferably effected automatically by a switch comprising two contacts 18, 19 which are arranged in the circuit of the lamp and generator and mounted on two parts of the semaphore arm which are movable relatively to each other. As shown in Fig. 4, of the drawings, this preferably is accomplished by mounting the two switch contacts on the pivots which connect the opposing ends of two pairs of adjacent semaphore levers, whereby these contacts are engaged with each other and close the electric circuit when the semaphore levers are projected laterally from the casing but are separated from each other and break the electric circuit when the semaphore levers are retracted within the casing. In order to permit of cutting out the electric lamp so that the same will not be illuminated upon projecting the semaphore arm during the daytime a separate cut-out switch 20 may be arranged in the electric circuit, as shown in Fig. 2.

Instead of operating the semaphore arm by means of a shipper rod, as shown in Fig. 2, substantially the same result may be obtained by means of a rock shaft 21 which is journaled on the casing, as shown in Fig. 6 and provided outside of the casing with a handle or crank 22 for manipulating the same while its inner end passes loosely through one of the levers of the innermost pair and is connected with the other lever of the innermost pair so as to turn therewith. Upon rocking this shaft 21 the levers of the semaphore arm will be caused to fold and unfold in the same manner as heretofore described for causing the signal head and signal lamp to be projected from the casing or retracted within the same. When the rock shaft 21 is utilized for operating the semaphore arm a support is provided for the semaphore arm intermediate of the rock shaft at the inner end thereof and the signal head and lamp at the outer end thereof so that the semaphore arm will be guided in its retracting and projecting movement. A suitable means for this purpose consists of a laterally projecting lug 23 arranged on one of the pivots connecting a pair of semaphore levers and provided with a roller 24 which engages between a pair of horizontal longitudinal flanges 25 secured to the inner side of one of the transverse walls of the casing and forming a guideway for the same, as shown in Figs. 6 and 7.

This automobile or vehicle signal device is very simple in construction, the same is neat in appearance, it can be very easily and readily operated and it has no delicate parts which are liable to get out of order.

I claim as my invention:

A signal device comprising a semaphore arm having a plurality of pivotally connected levers and pivotally mounted at its inner end on a fixed support, and a ring-shaped signal head having two semi-circular sections which have their outer ends pivotally connected and their inner ends pivotally connected respectively with two of said levers.

Witness my hand this 14th day of January, 1915.

JAMES J. LANAHAN.

Witnesses:
 THEO. L. POPP,
 ANNA HEIGIS.